United States Patent [19]
Hori et al.

[11] Patent Number: 5,457,498
[45] Date of Patent: Oct. 10, 1995

[54] TELEVISION SIGNAL DIGITIZING METHOD DIVIDING PROGRESSIVE-SCANNED SIGNAL INTO TWO COMPLEMENTARY INTERLACE SIGNALS

[75] Inventors: Akihiro Hori; Tadao Kurosaki; Masakatsu Tanaka, all of Tokyo, Japan

[73] Assignee: Nippon Television Network Corporation, Tokyo, Japan

[21] Appl. No.: 184,230

[22] Filed: Jan. 19, 1994

[30] Foreign Application Priority Data

Jul. 22, 1993 [JP] Japan .................... 5-181091

[51] Int. Cl.$^6$ ........................... H04N 7/01
[52] U.S. Cl. ........................... 348/446; 348/453
[58] Field of Search ................... 348/446, 453, 348/455, 456, 458; H04N 2/01, 11/20

[56] References Cited

U.S. PATENT DOCUMENTS 5,012,326  4/1991  Sakamoto et al. .......... 348/446
5,043,802  8/1991  Tarumizu et al. ............ 348/446 X

OTHER PUBLICATIONS

Examination of a Progressive Component TV System With An Eye To Media Conversion—NAB 1993 Broadcast Engineering Conference Proceedings.

Primary Examiner—Victor R. Kostak
Attorney, Agent, or Firm—Eliot S. Gerber

[57] ABSTRACT

A television signal digitizing method reduces the quantity of information without deterioration of image quality when digitizing progressive-scanned signals. The method uses a step of dividing a progressive-scanned information into two complementary interlaces, that is, an interlace 1 and an interlace 2; a step of converting luminance information in the interlace 1 to digital information whose sampling frequency is X; a step of converting chrominance information in the interlace 1 to digital information whose sampling frequency is Y; and a step of generating supplementary information.

26 Claims, 5 Drawing Sheets

O : INTERLACE 1
X : INTERLACE 2

FD = b − a

O : INTERLACE 1
X : INTERLACE 2

FD = b − c (or d − c)

TELEVISION SIGNAL DIGITIZING METHOD DIVIDING PROGRESSIVE-SCANNED SIGNAL INTO TWO COMPLEMENTARY INTERLACE SIGNALS

BACKGROUND OF THE INVENTION

The present invention relates to a television signal digitizing method effective to digitize a television signal by suppressing increase of information quantity at progressive scanning.

Conventionally, as a digitizing method for an interlaced scan television signal, as defined in the CCIR (Comite Consultatif Internationale des Radio-communications) Recommendation 601, a signal digitizing method commonly known as the 4:2:2 (hereinafter referred to as 422) that samples a luminance signal with 13.5 MHz and a chrominance signal with 6.75 MHz in the case of 525 scanning lines and 60 fields/sec or 625 scanning lines and 50 fields/sec is used broadly.

Here, "4" in the above indicates luminance data sampled with 13.5 MHz, "2" indicates chrominance data sampled with 6.75 MHz.

Contrary to this, in case of digitizing a progressive-scanned television signal, since the quantity of information is twice of that of interlace-scanned information, a digitizing method so-called 8:4:4 (hereinafter referred to as 844) that samples a luminance signal with 27 MHz and a chrominance signal with 13.5 MHz is used.

It is to be noted that description on "The operation and maintenance manual" (issued on March, 1991) for "D-1 Signal Converter BKDV 4224DA" by Sony Corp. can be referred for this 844 digitizing method.

Incidentally, in any cases of digitizing methods described above, the sampling frequency for a chrominance signal is lower than that for a luminance signal. The reason is that these methods use the human eye's characteristics that even if the quantity of chrominance information is a half of that of luminance information the deterioration of picture image quality can not be perceived much.

A method called 4:2:0 using this characteristics is also proposed for interlace scan. It is considerable to apply this method to progressive scan to further reduce information quantity.

If applying this method to progressive scan, however, a defect on cost occurs because an additional equipment is necessary to change location of a sampling point.

From the above reason, a new television signal digitizing method has been desired for progressive scan by using the above-mentioned characteristics, that is a method enabling to further reduce information quantity without deterioration of picture image quantity and being compatible with 422 signal, when digitizing progressive-scanned signals.

SUMMARY OF THE INVENTION

An object of the present invention is to offer a television signal digitizing method enabling to further reduce information quantity without deterioration of image quality using characteristics described above when digitizing progressive-scanned signals.

The object of the present invention is achieved by a television signal digitizing method comprising:

a step of dividing a progressive-scanned information ("progressive-scanned information signal") into two complementary interlaces, that is an interlace 1 ("first interlace signal") and an interlace 2 (second interlace signal);

a step of converting a luminance information (luminance information signal) in said interlace 1 to digital information of which sampling frequency is X;

a step of converting a chrominance information (chrominance information signal) in said interlace 1 to digital information of which sampling frequency is Y; and a step of generating a supplementary information from said luminance information in said interlace 2.

More, the object of the present invention is achieved also by A television signal digitizing method comprising:

a step of dividing a progressive-scanned information into a first information consisted of each two lines that are located at same position in respective fields, and a second information complementary to said first information;

a step of converting luminance information in said first information to digital information of which sampling frequency is X;

a step of converting chrominance information in said first information to digital information of which sampling frequency is Y; and a step of generating supplementary information from luminance information in said second information.

The term "complementary" means that a first set of scanning lines, preferably the odd lines, are allocated to interlace 1 (first interlace signal) and the set of remaining scanning lines, preferably the even lines, are allocated to interlace 2 (second interlace signal).

It is to be noted that it is desirable that said sampling frequency X is 27/2 MHz from the view point of coordination with 422 of prior art.

More, it is desirable that said sampling frequency X is 27/4 MHz or 27/8 MHz from the view point of coordination with 422 of prior art.

More, it is a well-known fact in digitally sampling that it is desirable that said progressive-scanned information is band-limited so as to prevent an aliasing error.

More, it is desirable to comprise a step of vertically band-limiting said chrominance information in said progressive-scanned information so as to prevent an aliasing error, before said step of dividing said progressive-scanned information into two complementary interlaces, that is said interlace 1 and said interlace 2.

More, it is desirable to comprise a step of generating a supplementary information from said luminance information in said interlace 1 and said luminance information in said interlace 2, instead of said step of generating said supplementary information from said luminance information in said interlace 2.

More, it is desirable that said step of generating said supplementary information from said luminance information in said interlace 2 comprises a step of converting said luminance information in said interlace 2 to a digital information of which sampling frequency is X.

More, it is desirable that said step of generating said supplementary information from said luminance information in said interlace 2 comprises a step of said converting said luminance information in said interlace 2 to a digital information of which sampling frequency is X/2.

More, it is desirable that said supplementary information is said luminance information in said interlace 2.

More, it is desirable that said supplementary information is a field difference information consisted of a difference between two luminance informations in said interlace 1 and said interlace 2.

More, it is desirable that said supplementary information is a 2-line difference information consisted of a difference between two luminance informations of said interlace 1 and said interlace 2 in a same field.

Further more, it is desirable that said supplementary information is a 3-line difference information consisted of a difference between two luminance informations of said interlace 1 and said interlace 2 in a same field.

By the present invention configured as above, when digitizing a progressive-scanned information it becomes possible to reduce the information quantity of the progressive-scanned information without deterioration of picture image by reducing chrominance information and adding a supplementary information.

More, the 422 in the 422+α (α is a supplementary information) is the same data as that of the interlace 422 of prior art, so that it has good compatibility with data of prior art.

Further more, by the present invention, it is possible to use existing equipment such as VCRs, switchers, etc., so that it is also possible to build a system in low-cost.

DETAILED DESCRIPTION

The embodiments of the present invention are explained referring figures.

It is to be noted that, in the following explanation, it is supposed that the number of the scanning lines is 525. In addition, as prerequisites for signal processing, the following two conditions are supposed.

(1) In the picture image processing system, any processing by motion detection is not performed.

(2) In the decoding side, a picture image is regenerated basically in a reverse process that have been done in encoding processing.

First of all, the first embodiment is explained.

The first embodiment explains cases of so-called 422+"4" (hereinafter referred to as 4224) and 422+"2" (hereinafter referred to as 4222) that divide a television signal obtained by progressive-scanned information with sampling frequency 27 MHz into the interlace 1 and the interlace 2 that are complementary each other, respectively convert a luminance information in the interlace 1 to a digital information of which sampling frequency is 27/2 MHz and a chrominance information in the interlace 1 to a digital information of which sampling frequency is 27/4 MHz, and generate a supplementary information from a luminance information in the interlace 2. Where, the "4" in the 422+"4" and "2" in the 422+"2" express a supplementary information described later.

Figure 1:
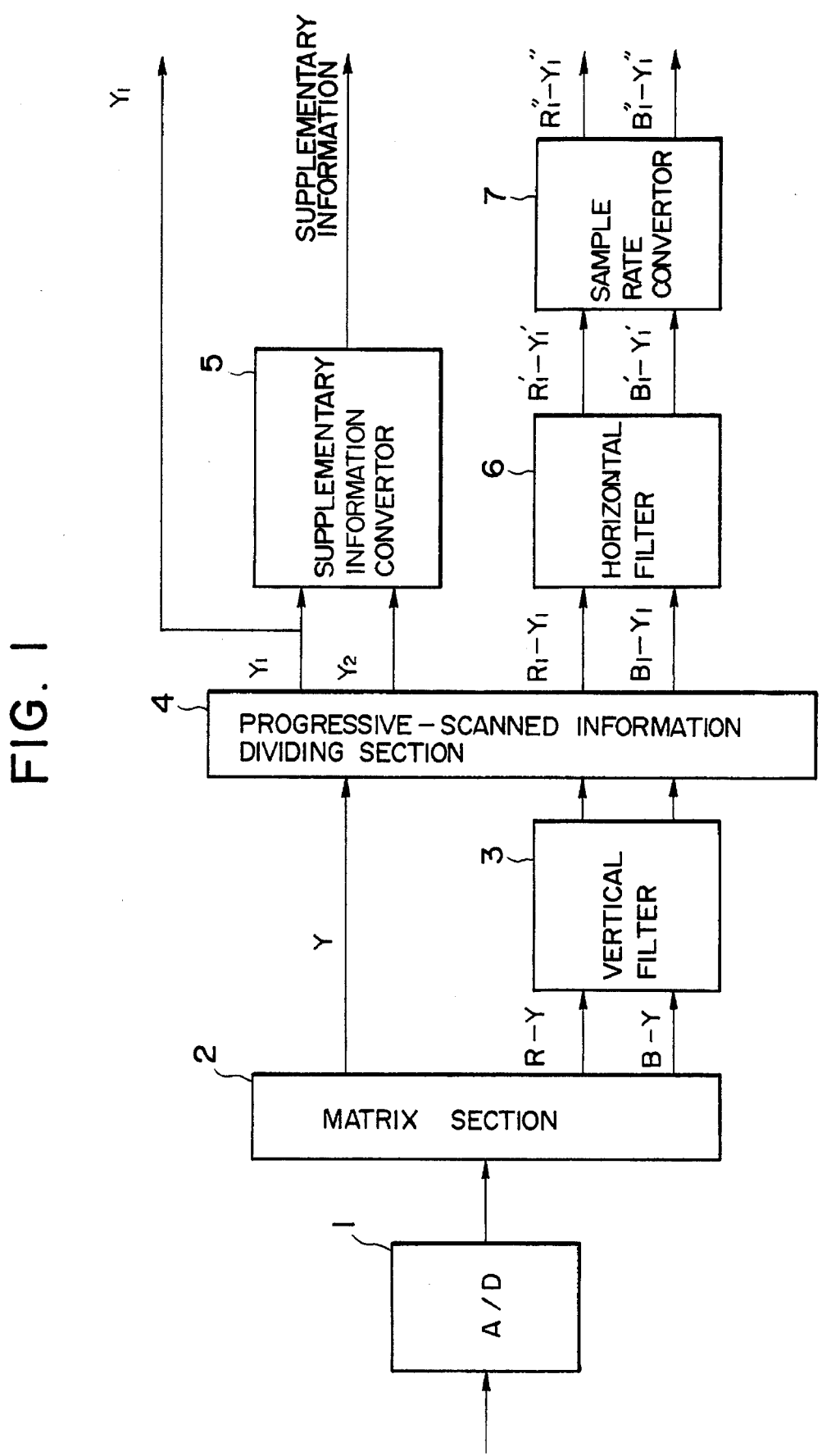
FIG. 1 is a block diagram showing an embodiment of a television signal digitizing method of the present invention.
Figure 2:
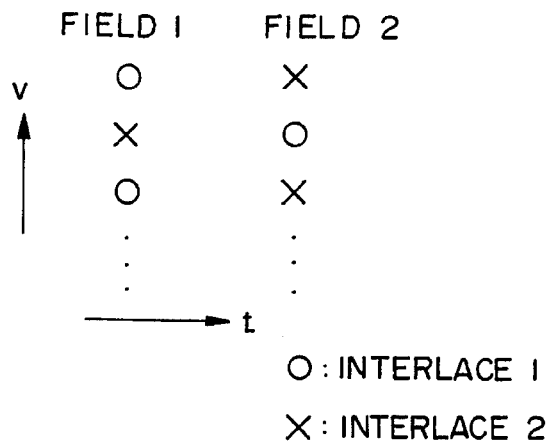
FIG. 2 is a figure showing interlace 1 and interlace 2.

FIG. 1 is a block diagram showing a television signal digitizing method.

As shown in FIG. 1, a progressive-scanned television signal (RGB signal) is sampled with 27 MHz in the A/D convertor section 1. Here, it is supposed that the television signal that is sampled is band-limited within 27/2 MHz in analog frequency band.

At first, the sampled television signal (RGB signal) is converted in the matrix section 2 to a luminance information Y, a chrominance information R-Y and a chrominance information B-Y.

Continuously, the chrominance information R-Y and the chrominance information B-Y are band-limited at 120 cycle per picture height (hereinunder referred to as cph) with the vertical filter 3 to present aliasing error.

Next, the luminance information Y, the chrominance information R-Y and the chrominance information B-Y are divided in the progressive-scanned information dividing section 4 into an interlace 1 and an interlace 2.

Now, the step of dividing a progressive-scanned information that is the luminance information Y, the chrominance information R-Y and the chrominance information B-Y into the interlace 1 and the interlace 2 is explained in details.

Figure 3:
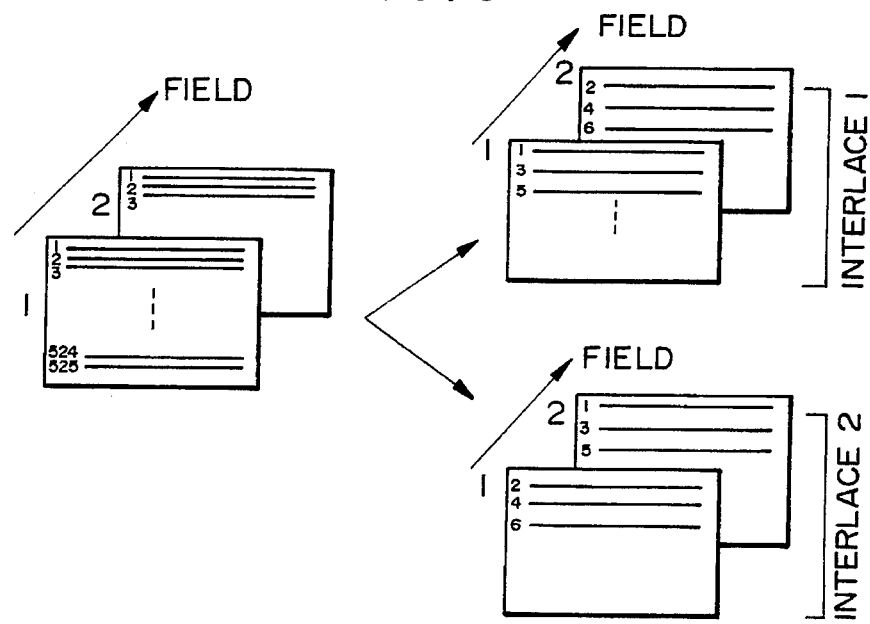
FIG. 3 is a figure to explain a process to divide a progressive scan into an interlace 1 and an interlace 2.

FIG. 3 is a figure to explain the step of dividing the progressive-scanned information into the interlace 1 and the interlace 2.

The progressive-scanned information dividing section 4 received the first field's progressive-scanned information (the luminance information Y, the chrominance information R-Y and the chrominance information B-Y) allocates odd scanning line number (1, 3, . . . ) information in the progressive-scanned informations of the first field to the interlace 1, and allocates even scanning line number (2, 4, . . . ) informations to interlace 2. Thus, the first field of the interlace 1 consisted of odd scanning line number (1, 3, . . . ) informations and the first field of the interlace 2 consisted of even scanning line number (2, 4, . . . ) informations are formed.

Next, the progressive-scanned dividing section 4 received the second field's progressive-scanned information (the luminance information Y, the chrominance information R-Y and the chrominance information B-Y) allocates even scanning line number (2, 4, . . . ) information in the progressive scan informations of the second field to the interlace 1, and allocates odd scanning line number (1, 3, . . . ) informations to the interlace 2. Thus, the second field of the interlace 1 consisted of even scanning line number (2, 4, . . . ) informations and the second field of the interlace 2 consisted of odd scanning line number (1, 3, . . . ) informations are formed.

Then, the progressive-scanned information (the luminance information Y, the chrominance information R-Y and chrominance information B-Y) are divided into the interlace 1 and the interlace 2 that are complementary each other.

The luminance information Y1 of the divided interlace 1 becomes a digital information that is sampled with a sampling frequency 27/2 MHz.

The luminance information Y2 in the interlace 2 or the luminance informations Y1 in the interlace 1 and Y2 in the interlace 2 are converted into a supplementary information by the supplementary information convertor 5.

The kind of the supplementary information will be explained in details in later, however, it is specified the luminance information Y2 in the interlace 2, here.

Also, it is supposed that the quantity of the supplementary information is that of the information equivalent to "4" that is a digital information of which sampling frequency is 27/2 MHz, or that of the information equivalent to "2" that is a digital information of which sampling frequency is 27/4 MHz. If supposing that the quantity of the supplementary information is that of the information equivalent "2" (a digital information of which sampling frequency is 27/4 MHz), a filter for preventing an aliasing error is necessary before dividing into the interlace informations.

Although the band was expressed by a theoretical value in the above explain, it will be expressed by a substantially realized value in the following explanation. The reason is that it is difficult to realize an ideal filter of which output is 0 in a pass rejection band. Therefore, if the sampling frequency is 27/2 MHz the band of an analog signal is limited to about 6 MHz, if the sampling frequency is 27/4 MHz it is limited to about 3 MHz.

On the other hand, the divided chrominance informations R-Y and B-Y respectively use only the chrominance informations $R_1$-$Y_1$ and $B_1$-$Y_1$ in the interlace 1.

Then, the chrominance information $R_1$-$Y_1$ in the interlace 1 are horizontally limited to about 3 MHz by the horizontal filter 6.

Next, the number of sampling points are reduced to ½ by the horizontal sample rate convertor 7 that takes the information of every two points.

As the result, the chrominance informations $R_1$-$Y_1$ and $B_1$-$Y_1$ becomes a digital information sampled with sampling frequency 27/4 MHz.

Through the above process, the television signal obtained by the progressive scan is digitized into the form of 4224 or 4222. Where, the first "4" is a luminance information in the interlace 1, the middle "2"s are chrominance informations $R_1$"$Y_1$" and $B_1$"-$Y_1$" in the interlace 1 and the last "4" is a supplementary information for a progressive scan. Here, however, the luminance information in the interlace 2 is used as it is as a supplementary information.

Next, the second embodiment is explained.

The second embodiment explains the case of so-called 411+"2" (hereinafter referred to as 4112) that dividing a television signal obtained by progressive scanning of which sampling frequency is 27 MHz into an interlace 1 and an interlace 2 that are complementary each other, respectively converting a luminance information in the interlace 1 into a digital information of which sampling frequency is 27/2 MHz and a chrominance informations in the interlace 1 into a digital information of which sampling frequency is 27/8 MHz, and simultaneously generating a supplementary information from a luminance information in the interlace 2. Here, the "2" of the 411+"2" expresses a supplementary information.

For the case of 4112, it is same as the 4222 described above except for converting the chrominance information in the interlace 1 to a digital information of which sampling frequency is 27/8 MHz. So, the step of converting a chrominance information in the interlace 1 to a digital information of which sampling frequency is 27/8 MHz.

At first, a chrominance informations R-Y and B-Y that has been output from the matrix section 2 are band-limited to 120 cph band by the vertical filter 3 for preventing aliasing error.

Next, the band-limited chrominance information R-Y and B-Y are divided into an interlace 1 and interlace 2 by the progressive-scanned information dividing section 4.

Next, the chrominance informations $R_1$-$Y_1$ and $B_1$-$Y_1$ are horizontally band-limited to about 1.5 MHz for preventing aliasing error by the horizontal filter 7. Then, the horizontal sample rate convertor 8 reduces a number of sampling points in horizontal direction to ¼.

As the result, the chrominance informations $R_1$-$Y_1$ and $B_1$-$Y_1$ are respectively band-limited to 120 cph in vertically and to 1.5 MHz in horizontally. Thus, it means that they have been converted to the digital information equivalent to "1", that is the information sampled with the sampling frequency of 27/8 MHz.

Through the above processes, the progressed-scanned television signal is digitized into the form of 4112.

Next, the supplementary information is explained.

For this supplementary information, following four kinds can be listed up.

(a) The case that the supplementary information is a simple luminance information Y (the luminance information in the interlace 2 is used as it is).

In this case, if 4224, a luminance information can be transmitted in full-band of the progressive scanning shown with the sampling frequency of 27 MHz, it is equivalent about horizontal band 6 MHz in case of interlace scanning.

It is to be noted that, in 4222/4112, only a analog frequency band of about 3 MHz, that is, a half of the sampling frequency 27/2 MHz of the supplementary information for progressive scan conversion, can exist for the supplementary information. Therefore, it becomes a progressive scan display of which horizontal band is limited to a half for each one line.

In this case of simply limiting the band, since an aliasing error occurs, it is necessary a filter to prevent the aliasing error before dividing into the interlace informations.

Figure 4:
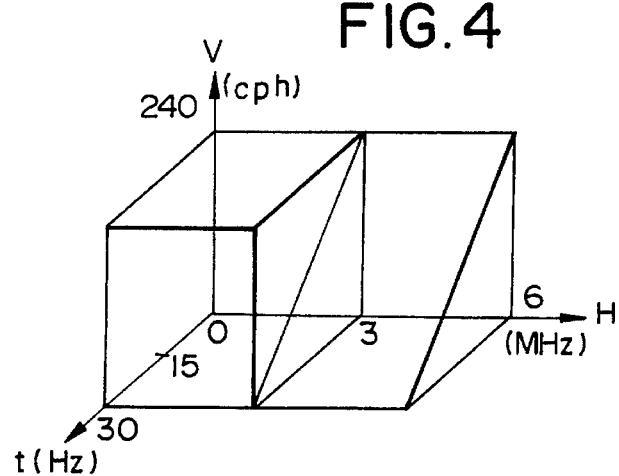
FIG. 4 is a figure showing a regeneratable area of 4222/4112 in case that a supplementary information is a luminance information.

A regeneratable three-dimensional spectrum for of 4222/4112 in case that a supplementary information is luminance itself is shown in FIG. 4.

In addition, for such a three-dimensional frequency spectrum display it can be referred, for example, descriptions in "Multi-dimensional signal processing for television screen image" (1988, Nikkan Kogyo Shinbunn) written by Takahiko Fukinuki.

FIG. 4 typically illustrates information that is lost by band limitation of interlace scanning signals in the interlace 2.

Figure 5:
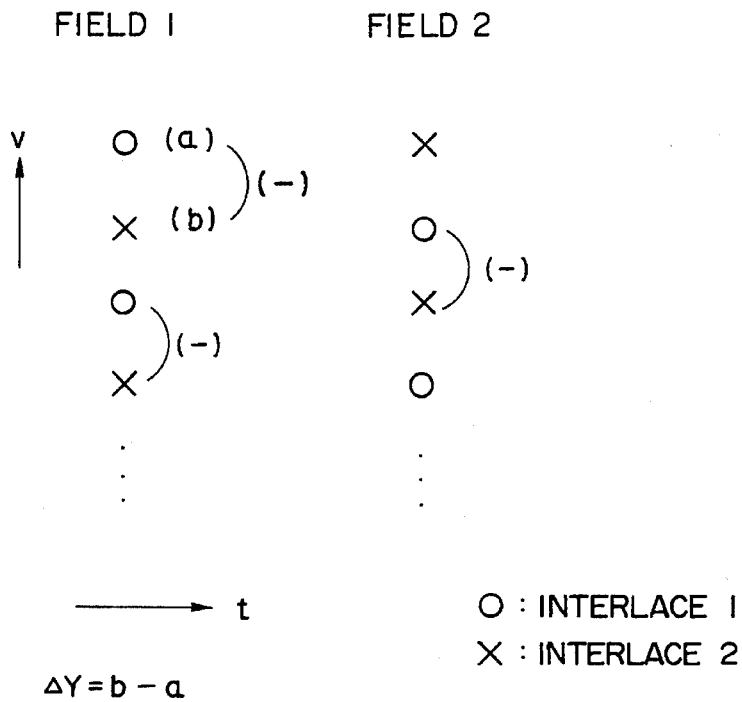
FIG. 5 is a figure to explain a supplementary information.

(b) The case that the supplementary information is a 2-line difference information of interlace 1 and interlace 2 in the same field (ΔY. ΔY=b−a in FIG. 5).

Also in this case, in 4224, since the ΔY has information sampled with 27/2 MHz (about 6 MHz band width described above) as the supplementary information, the luminance spectrum becomes the same as one sampled with 27 MHz by progressive scanning. But, this is a difference information, so that a twice value is necessary for its dynamic range.

In 4222 and 4112, however, since the supplementary information band is limited to a half, a diagonally high frequency (vertically high frequency and horizontally high frequency) component can not be regenerated. Therefore, it is necessary to remove the diagonally high frequency component (pre-filtering) before dividing into the interlace informations.

Figure 6:
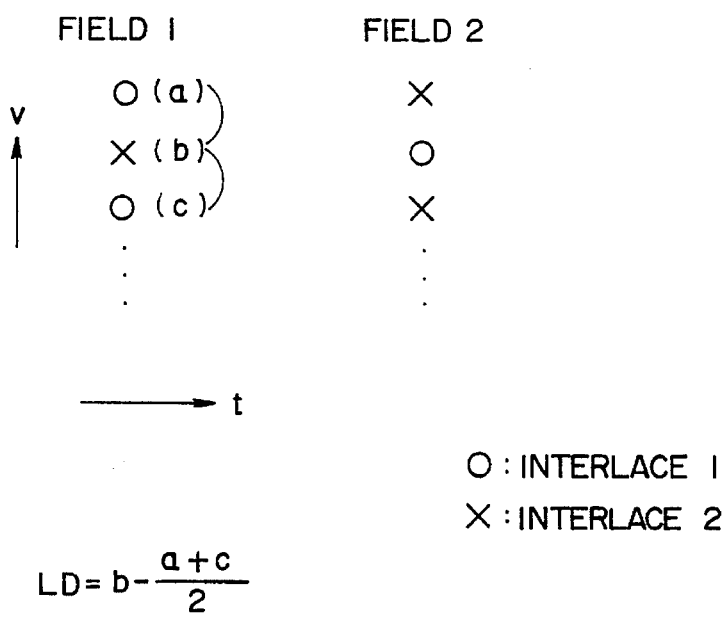
FIG. 6 is a figure to explain a supplementary information.

(c) The case that the supplementary information is a 3-line difference information of interlace 1 and interlace 2 in a same field (LD. LD=b−(a+c)/2 in FIG. 6).

In this case, since a regeneratable spectrum basically has a characteristics same as that of ΔY in (b), it is necessary a pre-filtering if the band is limited (4222/4112).

Figure 7:
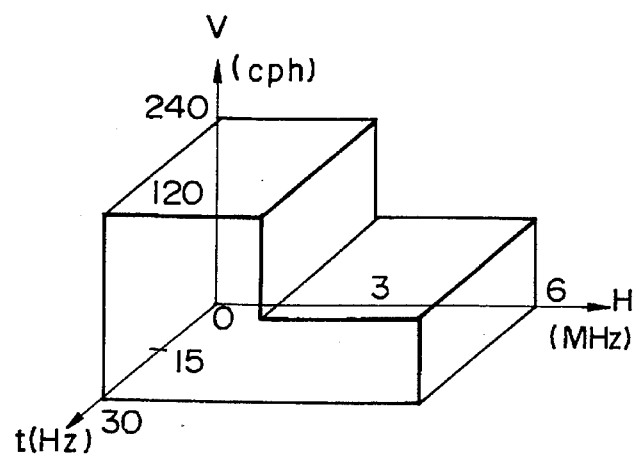
FIG. 7 is a figure showing three-dimensional spectrum of luminance for 4222/4112 in case that a supplementary information is ΔY or LD.

It is to be noted that, since LD is a 3-line difference information, so that it is not same as ΔY in (b). That is, the difference comes from the difference between vertical 2-tap filter and 3-tap filter. The regeneratable three-dimensional spectrum of luminance of 4222/4112 in the case that the supplementary information is ΔY or LD is shown in FIG. 7.

Figure 8:
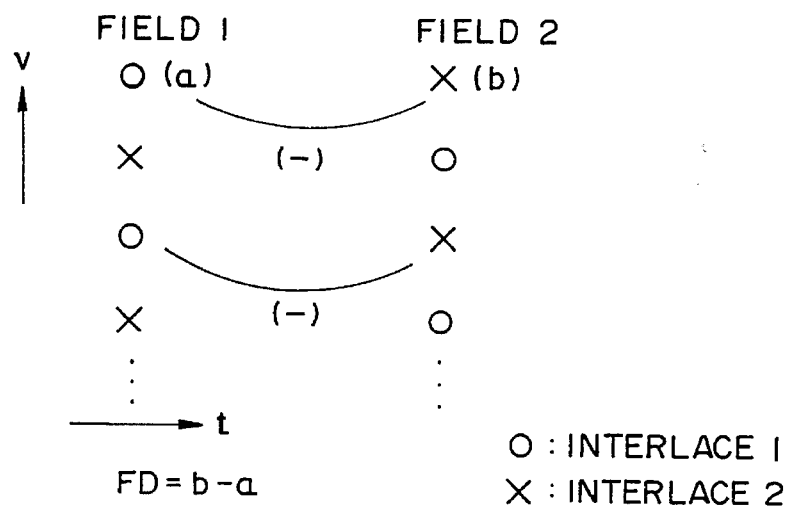
FIG. 8 is a figure to explain a supplementary information.

(d) The case that the supplementary information is a field difference signal (FD. FD=b−a in FIG. 8).

In this case, when the field difference information is 0, that is, when the case of a still picture, regenerated luminance is same as that in 4224 in any cases of 4224, 4222, 4112.

Figure 9:
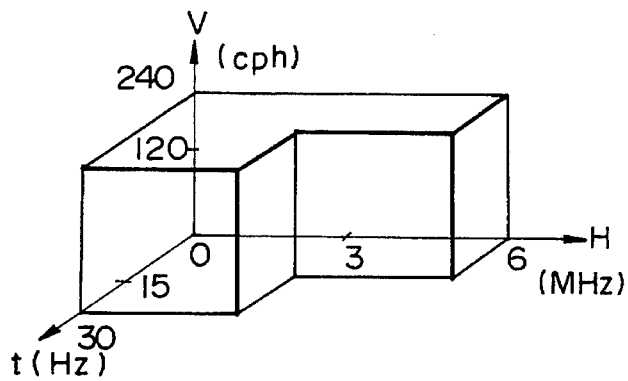
FIG. 9 is a figure showing three-dimensional spectrum of luminance for 4222/4112 in case that a supplementary progressive-providing information is FD.

For moving pictures, on the other hand, the horizontal high-frequency component cannot be generated because of the bandwidth limitation when 4222 and 4112. The luminance regenerative spectrum of 4222/4112 when a supplementary information is ΔY or LD is shown in FIG. 9.

Hereafter, operations in cases of applying above methods are explained.

Firstly, in case of 4224, a luminance information of which horizontal direction band is about 12 MHz by progressive scanning (equivalent to about 6 MHz by interlace scanning) is obtained.

On the other hand, on the chrominance information in this case, only such a resolution of which horizontal direction is about 3 MHz, vertical direction 120 cph can be obtained. Based on a subjective assessment performed in past, however, it is confirmed that if about 2 MHz of horizontal direction and 120 cph of vertical direction are secured, a practically satisfied picture image quality can be obtained as chrominance information by progressive scanning.

Therefore, as the display image quality for 525 lines progressive scan, there is very slight difference on picture image quality between the information of 4224 described above and that of 844 described above. It is not necessarily true, however, when processing images (chroma key, conversion to HD, DVE, etc., for example) are done using this information.

In the case of 4224, if the supplementary information is any one of Y, ΔY or LD, regenerated spectrum is as the same as 844. Therefore, it is considered that the method to record and transmit the simplest luminance information (Y) is most suitable.

Next, the case of 4222 is explained.

In 4222, described as above, the band allocated to a supplementary information is "2", that is about 3 MHz. The displayable three-dimensional spectrum varies according to what is allocated as a supplementary information.

(1) The case that the supplementary information is luminance information (Y).

If the supplementary information is the luminance information (Y), the band of the interlace 1 is about 6 MHz, that of the interlace 2 is a half thereof, that is only about 3 MHz.

Therefore, the band of the displayed image is limited for each one line, the image quality thereof is worse than that using correlation such as ΔY or LD.

(2) The case that the supplementary information is between-line difference information. (LD/ΔY)

The regenerative three-dimensional spectrum of ΔY or LD in the case of 4222 is the same as the area shown in FIG. 7.

Also, the difference between LD and ΔY is whether the vertical filter is of 3-tap or 2-tap. If the number of taps of the vertical filter increases, vertical high components can be sharply extracted. However, the hardware becomes more complicated for the increment of taps.

Like this, if making the filter sharp, energy of a supplementary information becomes small, so that deterioration of picture image quality caused by band limitation is difficult to occur.

Therefore, the picture image quality of LD is slightly better than that of ΔY. Selection of whether ΔY or LD means selection for whether simplicity of hardware or image quality.

It is to be noted that simple limitation of band as described above occurs lack of information and an aliasing error, so that filtering is necessary in advance to remove the diagonally high frequency components that are not regenerative.

(3) The case that the supplementary information is FD.

The displayable spectrum of 4222 in this case is the same as the spectrum shown in FIG. 9. Also in this case like in the cases of ΔY and LD, pre-filtering before sample rate conversion is necessary to prevent an aliasing error caused by sample rate conversion. This filtering contains processing in time dimension, so that the hardware configuration may slightly become more complicated and expensive than the cases of ΔY and LD.

The important feature of FD is that the regenerative spectrum of luminance of a still picture thereof is the same as the case of 4224, that is, its characteristics is good for still pictures to which human eyes have high resolution. Therefore, for the case of 4222, the general quality of image of FD is better than that of LD or ΔY.

From above, considering simplicity for hardware, LD is best as a supplementary information for 4222, or FD is best for picture image quality.

Next, The third embodiment is explained.

Figure 10:
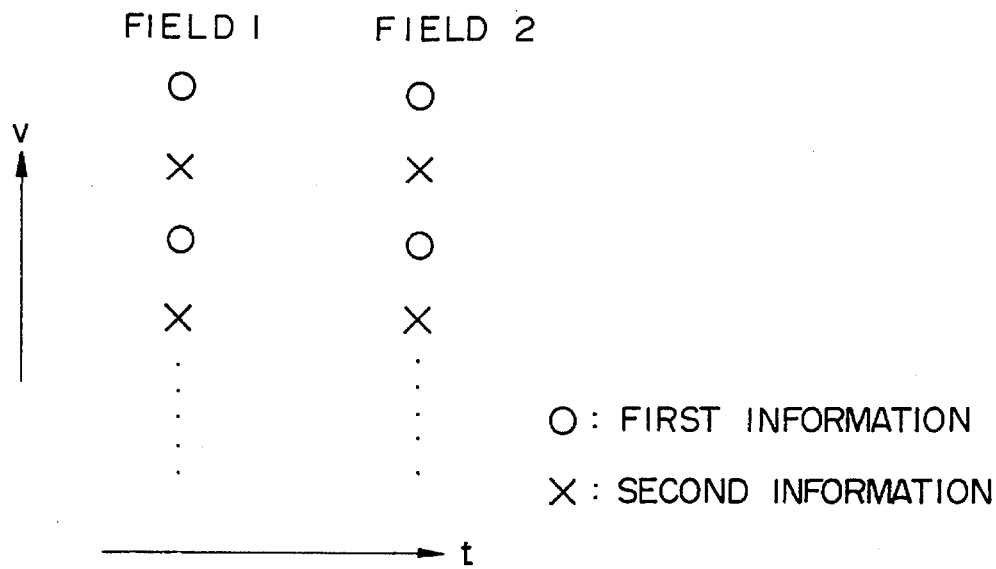
FIG. 10 is a figure showing a first information and a second information.

In the third embodiment, the step of dividing a progressive-scanned information into two is different from that of the first embodiment and the second embodiment. As shown in FIG. 10, in the third embodiment, the progressive-scanned information is divided into two, one is the first information where each two scanning lines of the progressive-scanned information are located on the same scanning line location in each field, another one is the second information complementary to the first information.

The other steps of the third embodiment are the same as those of the first embodiment and the second embodiment, so detailed explanations are omitted.

In the third embodiment, the same quality of picture image as that of the first embodiment and the second embodiment can be obtained.

However, compatibility of the obtained picture image with the interlaced signal 422 by prior art becomes worse. Even if using 422 of the first part of 4224 or 4222 that are obtained in the steps of the embodiment, an interlaced picture image same as that by prior art can not be obtained.

For the simple luminance information (Y), the 2-line difference information (ΔY), the 3-line difference information (LD), there are not so big differences as compared with to the first embodiment and the second embodiment.

Figure 11:
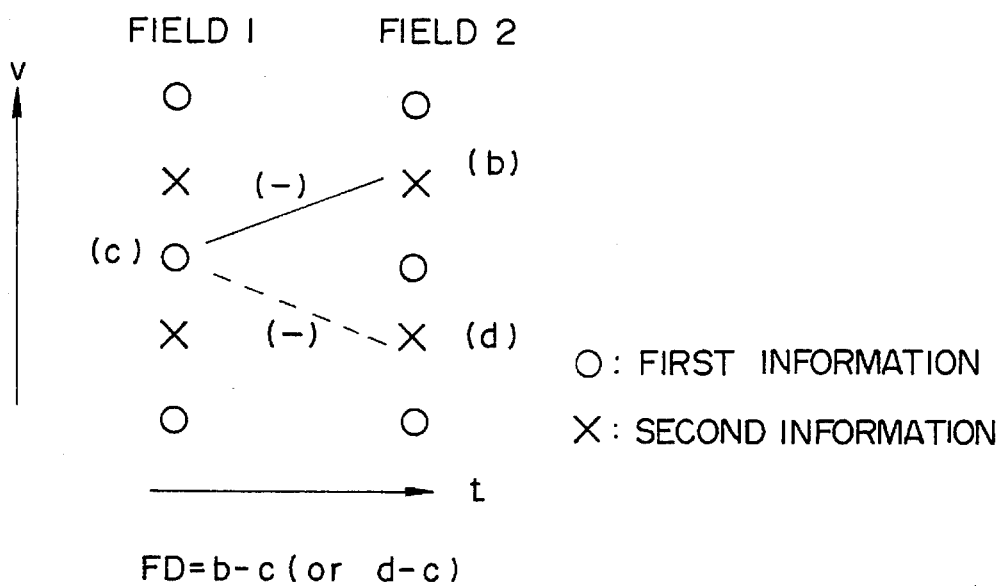
FIG. 11 is a figure to explain a supplementary information.

However, for the field difference information (FD) of the third embodiment, it is a between-line difference information locating right above or right below each other across the fields as shown in FIG. 11.

Therefore, even for a still picture, this value is not 0, the displayable luminance spectrum by 4222 or 4112 is the same as that of the case of LD or ΔY in FIG. 7.

What is claimed is:

1. A television signal digitizing method comprising:
    a step of dividing a progressive-scanned information signal into two complementary interlace signals, that is a first interlace signal and a second interlace signal;
    a step of converting a luminance information signal in said first interlace signal to digital information whose sampling frequency is X;
    a step of converting a chrominance information signal in said first interlace signal to digital information whose sampling frequency is Y; and
    a step of generating supplementary information from said interface information signal in said second luminance signal.

2. The television signal digitizing method of claim 1 and employing a sampling frequency of 27/2 MHz for the sampling frequency X.

3. The television signal digitizing method of claim 1 and employing a sampling frequency of 27/4 MHz for the sampling frequency Y.

4. The television signal digitizing method of claim 1, and employing a sampling frequency of 27/8 for the sampling frequency Y.

5. The television signal digitizing method of claim 1, and band limiting said progressive-scanned information signal to prevent an aliasing error.

6. The television signal digitizing method of claim 1, comprising a step of band-limiting said chrominance information signal in said progressive-scanned information signal so as to prevent an aliasing error, before said step of dividing said progressive-scanned information signal into two complementary interlaces, that is said first interlace signal and said second interlace signal.

7. The television signal digitizing method of claim 1, wherein said step of generating said supplementary information from said luminance information signal in said second interface signal comprises a step of converting said luminance information signal in said second interlace signal to digital information whose sampling frequency is X.

8. The television signal digitizing method of claim 1, wherein said step of generating said supplementary information form said luminance information signal in said second interlace signal comprises a step of converting said luminance information signal in said second interlace signal to digital information whose sampling frequency is X/2.

9. The television signal digitizing method of claim 1, wherein said luminance information signal in said second interlace signal is generated as said supplementary information.

10. A television signal digitizing method comprising:
    a step of dividing a progressive-scanned information signal into two complementary interlace signals, that is a first interlace signal and a second interlace signal;
    a step of converting a luminance information signal in said first interlace signal to digital information whose sampling frequency is X;
    a step of converting chrominance information signal in said first interlace signal to digital information whose sampling frequency is Y; and
    a step of generating supplementary information from said luminance information signal in said first interlace signal and said luminance information signal in said second interlace signal.

11. The television signal digitizing method of claim 10, wherein a field difference information between two luminance information signals in said first interlace signal and said second interlace signals is generated as said supplementary information.

12. The television signal digitizing method of claim 10, wherein a 2-line difference information consisting of a difference between two luminance information signals of said first interlace signal, said second interlace signal in a same field is generated as said supplementary information.

13. The television signal digitizing method of claim 10, wherein a 3-line difference information consisting of a difference between two luminance information signals of said first interlace signal and said second interlace signal in a same field is generated as said supplementary information.

14. A television signal digitizing method comprising:
    a step of dividing a progressive-scanned information signal into a first information signal consisting of alternate lines that are located in respective fields, and a second information signal complementary to said first information signal;
    a step of converting a luminance information signal in said first information signal to digital information whose sampling frequency is X;
    a step of converting a chrominance information signal in said first information signal to digital information whose sampling frequency is Y; and
    a step of generating supplementary information from said luminance information signal in said second information signal.

15. The television signal digitizing method of claim 14 and employing a sampling frequency of 27/2 MHz for the sampling frequency X.

16. The television signal digitizing method of claim 14 and employing a sampling frequency of 27/4 Mhz for the sampling frequency Y.

17. The television signal digitizing method of claim 14, and employing a sampling frequency of 27/8 for the sampling frequency Y.

18. The television signal digitizing method of claim 14 and band limiting said progressive-scanned information signal to prevent an aliasing error.

19. The television signal digitizing method of claim 14, comprising a step of band-limiting said chrominance information signal in said progressive-scanned information signal so as to prevent an aliasing error, before said step of dividing said progressive-scanned information signal into said first information signal consisting of each two lines, that are located at the same position in respective fields, in said progressive-scanned information signal and said second information signal complementary to said first information signal.

20. The television signal digitizing method of claim 14, wherein said step of generating said supplementary information from said luminance information signal in said second information signal comprises a step of converting said luminance information signal in said second information signal to a digital information whose sampling frequency is X.

21. The television signal digitizing method of claim 14, wherein said step of generating said supplementary information from said luminance information signal in said second information signal comprises a step of converting said luminance information signal in said second interlace signal to digital information whose sampling frequency is X/2.

22. The television signal digitizing method of claim 14, wherein said luminance information signal in said second information signal is generated as said supplementary information.

23. A television signal digitizing method comprising:

a step of dividing a progressive-scanned information signal into a first information signal consisting of each two lines that are located at the same position in respective fields, and a second information signal complementary to said first information;

a step of converting luminance information signal in said first information signal to digital information whose sampling frequency is X;

a step of converting chrominance information signal in said first information signal to digital information whose sampling frequency is Y; and a step of generating supplementary information from said luminance information signal in said first information signal and said luminance information signal in said second information signal.

24. The television signal digitizing method of claim 23, wherein field difference information consisting of a difference between two luminance information signals in said first information signal and said second information signal is generated as said supplementary information.

25. The television signal digitizing method of claim 23, wherein a 2-line difference information consisting of a difference between two luminance information signals of said first information signal and said second information signal in a same field is generated as said supplementary information.

26. The television signal digitizing method of claim 23, wherein a 3-line difference information consisting of a difference between two luminance information signals of said first interlace signal and said second interlace signal in a same field is generated as said supplementary information.

* * * * *